United States Patent
Wang

(10) Patent No.: US 6,484,040 B1
(45) Date of Patent: Nov. 19, 2002

(54) WIRELESS MOBILE PHONE COMBINING WITH CAR HI-FI SPEAKERS

(76) Inventor: Ching Yuan Wang, 2F, No 138-1, 8 Lin, Lun-Ping Village, Kuan Yin, Tao Yuan Hsien (TW)

( * ) Notice: Subject to any disclaimer, the term of this patent is extended or adjusted under 35 U.S.C. 154(b) by 0 days.

(21) Appl. No.: 09/357,640

(22) Filed: Jul. 20, 1999

(51) Int. Cl.⁷ .................................................. H04Q 7/20
(52) U.S. Cl. ...................... 455/569; 455/557; 455/344; 381/311
(58) Field of Search ................................ 455/344, 425, 455/557, 569, 90, 550, 11.1, 556, 66, 568, 100, 151.2, 152.1, 200.1, 211, 212, 345, 350; 381/311

(56) References Cited

U.S. PATENT DOCUMENTS

| 5,379,338 A | * | 1/1995 | Umemoto et al. | ..... 379/388.03 |
| 6,052,603 A | * | 4/2000 | Kinzalow | ................... 455/557 |
| 6,112,103 A | * | 8/2000 | Puthuff | ....................... 455/557 |
| 6,173,195 B1 | * | 1/2001 | Chen | ........................... 455/569 |
| 6,272,359 B1 | * | 8/2001 | Kivela | ......................... 455/567 |
| 6,397,086 B1 | * | 5/2002 | Chen | ........................... 455/556 |

FOREIGN PATENT DOCUMENTS

| JP | 10-276261 | * 10/1998 | ............ H04M/1/60 |
| JP | 10-336311 | * 12/1998 | ............ H04M/1/60 |

* cited by examiner

*Primary Examiner*—Nay Maung
*Assistant Examiner*—Jean A Gelin
(74) *Attorney, Agent, or Firm*—Pro-Techtor International Services

(57) ABSTRACT

A wireless mobile telephone capable of remitting picking up of an earphone in use-but combining with car hi-fi speakers, which mobile telephone applies an infrared transmission principle or a radio transmission principle to transmit its received and emitting signals to a car hi-fi set. Therefore, the car speakers can broadcast the sound of the other side of the mobile phone call in remitting picking up of the earphone. In this way, the mobile telephone not only has the advantage of remitting picking up of the earphone, but also can be extremely convenient in use by having no connecting wire between the mobile telephone and the car hi-fi set.

5 Claims, 7 Drawing Sheets

WIRELESS MOBILE PHONE COMBINING WITH CAR HI-FI SPEAKERS

BACKGROUND OF THE INVENTION

1. Field of the Invention

The present invention relates to a mobile telephone capable of remitting picking up of an earphone in use but combining with car hi-fi speakers. And relates especially to a mobile telephone which can transmit the received and emitting signals to a car hi-fi set in a wireless mode, the sound of the user can be broadcast via the car hi-fi speakers.

2. Description of the Prior Art

Users of mobile telephones in the present days know how to use them without picking up earphones to ensure safety of car driving. A conventional car mobile telephone remitting picking up of an earphone in use shall have the mobile telephone mounted on a clamping seat in order that the sound signal from the other side of the phone call can be broadcast out of a speaker through a connecting signal line. Such a single speaker transmits sound with inferior quality. The sound is unclear and makes a user dislike.

Thereafter, some mobile telephones in the markets each provides a circuit between a mobile telephone and a car hi-fi set and is capable of remitting picking up of an earphone when in use. By providing of the circuit in remitting picking up of an earphone, sound output of the speakers can be controlled to emit the sound of the car hi-fi set or the sound of the other side of the mobile phone call. This is ideal at the first sight; however, it has a serious defect and inconvenience, i.e., a user must connect his mobile telephone with a connecting signal line once he gets in this car, otherwise, the function of remitting picking up of an earphone will not work. While in this quick pace of the industrial and commercial society, people tend to not accept such a bothersome connecting operation, especially those frequently get in and get out of their cars do.

In view of the above defects, the present invention is provided after study, developing and improvement, it is more advanced, convenient and faster for operation, for the goal of rendering the function of remitting picking up of an earphone more ideal and perfect.

SUMMARY OF THE INVENTION

The object of the present invention is to provide a mobile telephone capable of remitting picking up of an earphone in use but combining with car hi-fi speakers. The mobile telephone can transmit its received and emitting signals to a car hi-fi set via an infrared or radio transmitting device, so that the car speakers can broadcast the sound of the other side of the mobile phone call in remitting picking up of the earphone in use. And especially, a user needs not to connect his mobile telephone with the car hi-fi set once he gets in this car.

The present invention will be apparent after reading the detailed description of the preferred embodiment thereof in reference to the accompanying drawings.

DETAILED DESCRIPTION OF THE PREFERRED EMBODIMENT

Figure 1:
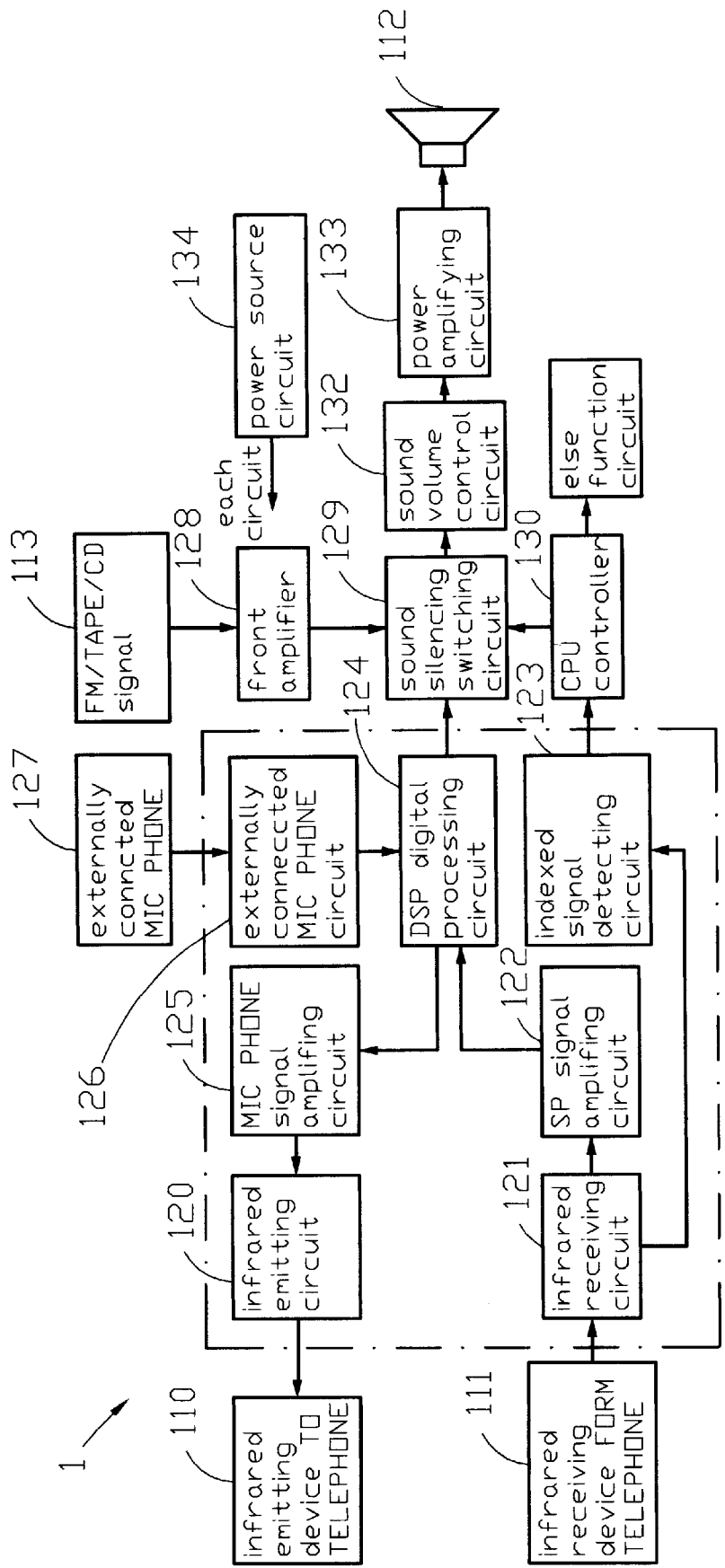
FIG. 1 is a block diagram of a car hi-fi set circuit using the infrared transmitting mode of the present invention.
Figure 2:
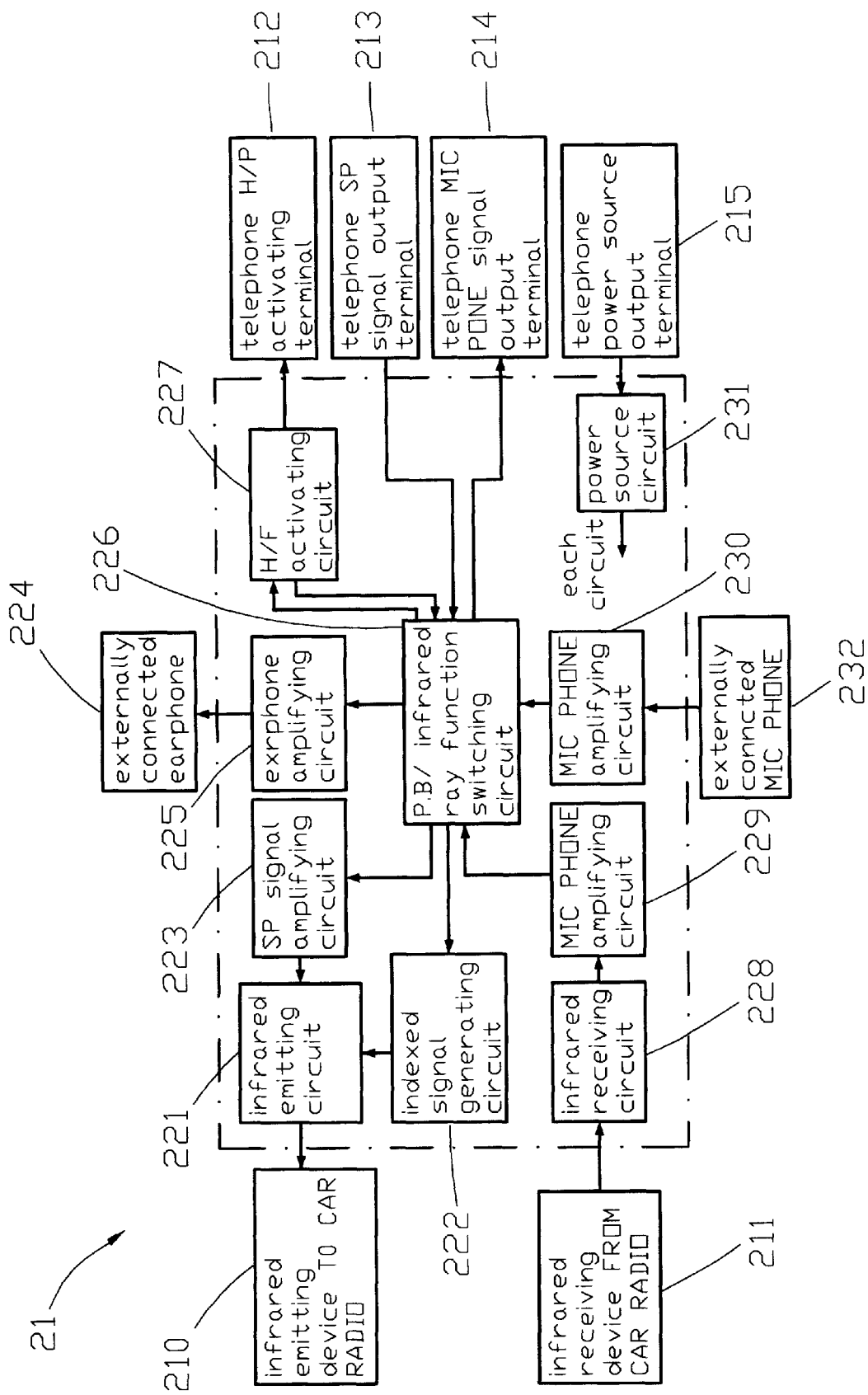
FIG. 2 is a block diagram of a signal transmission card of a mobile telephone using the infrared transmission mode of the present invention.
Figure 3:
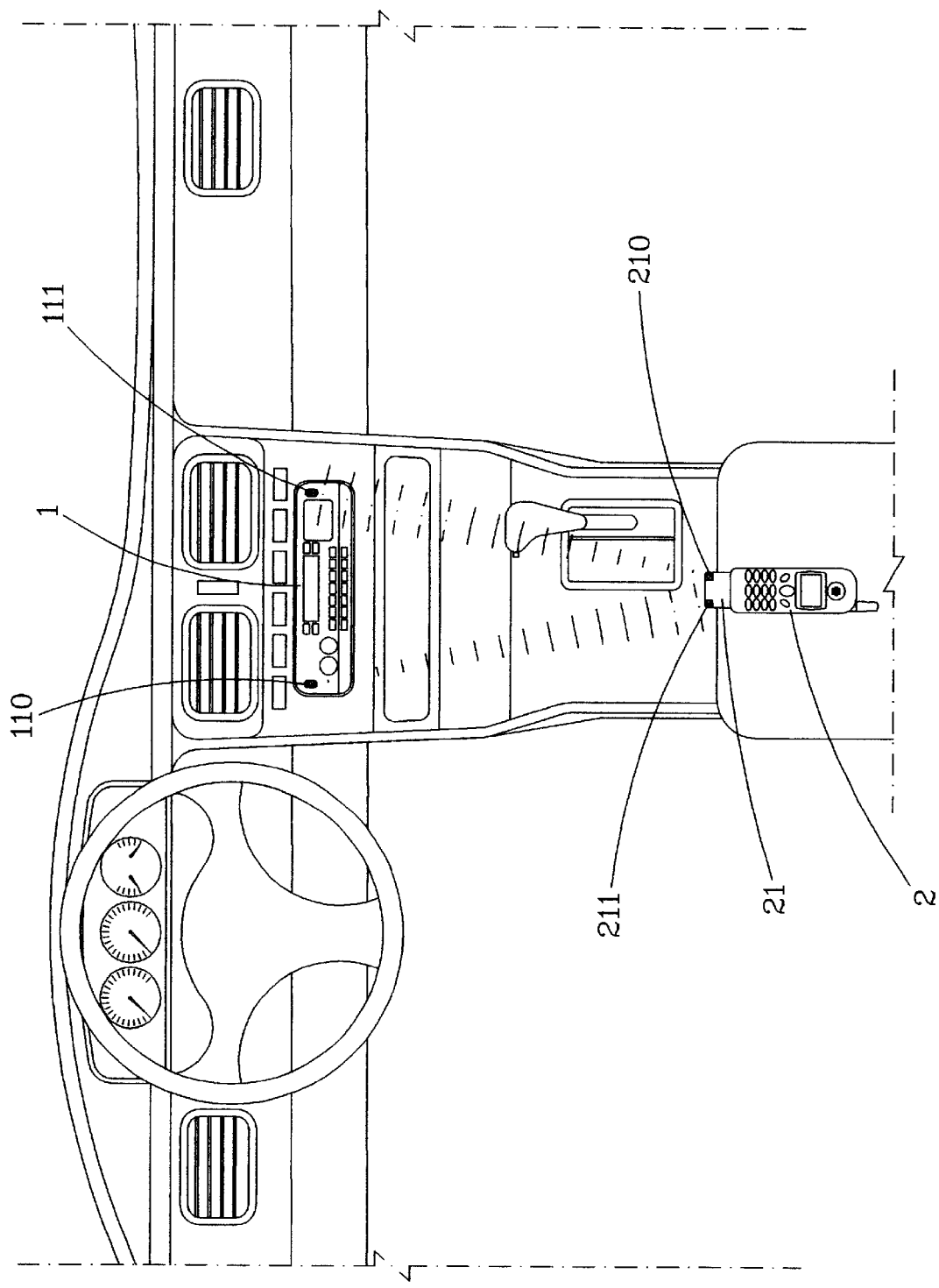
FIG. 3 is a schematic view showing the present invention using the infrared transmitting mode.

In a first embodiment, referring to FIGS. 1, 2 and 3, the wireless transmitting device of the present invention applies an infrared transmission principle. An infrared transmitting device provided herein is provided with a circuit having the block diagram shown in FIG. 1 used in a car hi-fi set 1 and a circuit having the block diagram shown in FIG. 2 used on a signal transmission card 21 of a mobile telephone 2. Wherein, the electric circuit used in the car hi-fi set 1 includes an infrared emitting device 110 and an infrared receiving device 111 on the panel thereof. The signal transmission card 21 on the mobile telephone 2 is also provided, in corresponding to the infrared emitting device 110 and the infrared receiving device 111, with an infrared emitting device 210 and an infrared receiving device 211. The mobile telephone 2 and the car hi-fi set 1 can get the wireless transmission of signals therebetween by providing the infrared emitting devices 110, 210 and the infrared receiving devices 111, 211.

As shown in FIG. 1, the circuit of the car hi-fi set 1 in the block diagram includes: the infrared receiving device 111, the infrared emitting device 110, an infrared emitting circuit 120, an MIC PHONE signal multiplying circuit 125, an infrared receiving circuit 121, an SP signal multiplying circuit 122, an indexed signal detecting circuit 123, an externally connected MIC PHONE circuit 126, an externally connected MIC PHONE 127, a DSP digital processing circuit 124, a sound silencing switching circuit 129, a CPU controller 130, a front multiplier 128, an FM/TYPE/CD signal source 113, a power source circuit 134, a sound volume control circuit 132, a power multiplying circuit 133 and a car speaker 112 etc.

As shown in FIG. 2, the signal transmission card 21 of the mobile telephone 2 in the block diagram includes: the infrared emitting device 210, the infrared receiving device 211, a telephone H/F activating terminal 212, a telephone SP signal output terminal 213, a telephone MIC PHONE signal output terminal 214, a telephone power source output terminal 215, an infrared emitting circuit 221, an indexed signal generating circuit 222, an SP signal multiplying circuit 223, an externally connected earphone 224, an earphone multiplying circuit 225, a PB/infrared ray function switching circuit 226, an H/F activating circuit 227, an infrared receiving circuit 228, an MIC PHONE multiplying circuit 229, an MIC PHONE multiplying circuit 230, a power source circuit 231 and an externally connected MIC PHONE 232 etc.

When the infrared receiving device 111 receives a signal from the infrared emitting device 210 of the signal transmission card 21 on the mobile telephone 2, the mobile telephone 2 uses it to deal with and silence the FM/TYPE/

CD signal 113 with the sound silencing switching circuit 129. So that the talking sound from the other side of the phone call can be broadcast out of the car speaker 112. At this time, the user can also speak to the externally connected MIC PHONE 127. The speaking sound signal can be emitted through the externally connected MIC PHONE circuit 126, the DSP digital processor 124, the MIC PHONE signal multiplying circuit 125, the infrared emitting circuit 120 and out of the infrared emitting device 110 toward the infrared receiving device 211 on the signal transmission card 21 of the mobile telephone 2.

Accordingly, the infrared transmission device of the present embodiment can combine the mobile telephone 2 with the car hi-fi set 1 and the car speaker 112. When the mobile telephone 2 is not in use, music from the car hi-fi set 1 can be played without impedance through the car speaker 112. When in use, the music can be silenced and the received speaking on the other side of a phone call through the mobile telephone 2 can be switched in. It can be seen from FIG. 3, the mobile telephone 2 of the present invention can get the object of infrared transmission without being connected with the car hi-fi set 1 via a signal line. This is extremely convenient for use.

Figure 4:
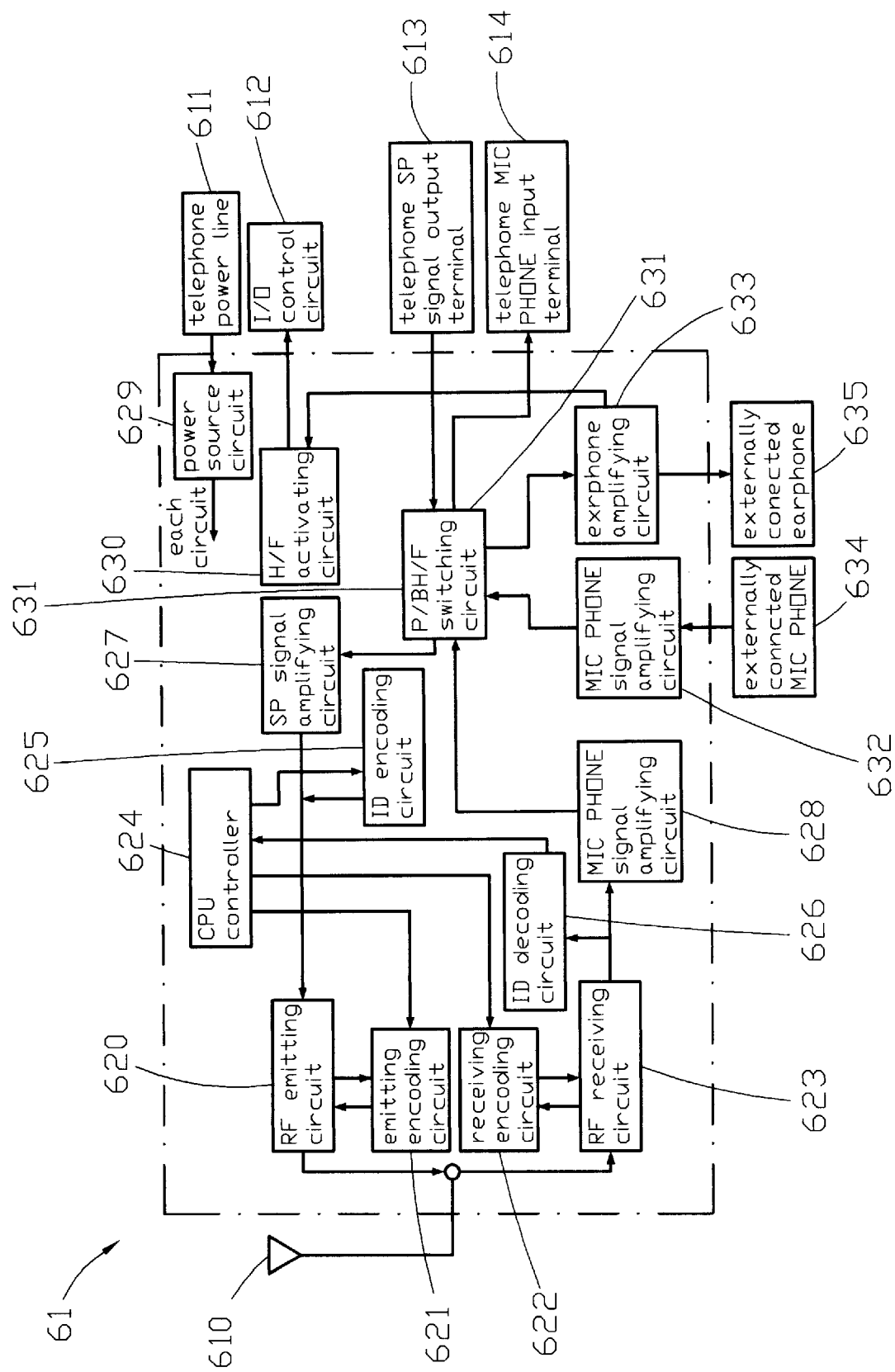
FIG. 4 is a block diagram of circuit in a signal transmission card of a mobile telephone using the radio transmission mode of the present invention.
Figure 5:
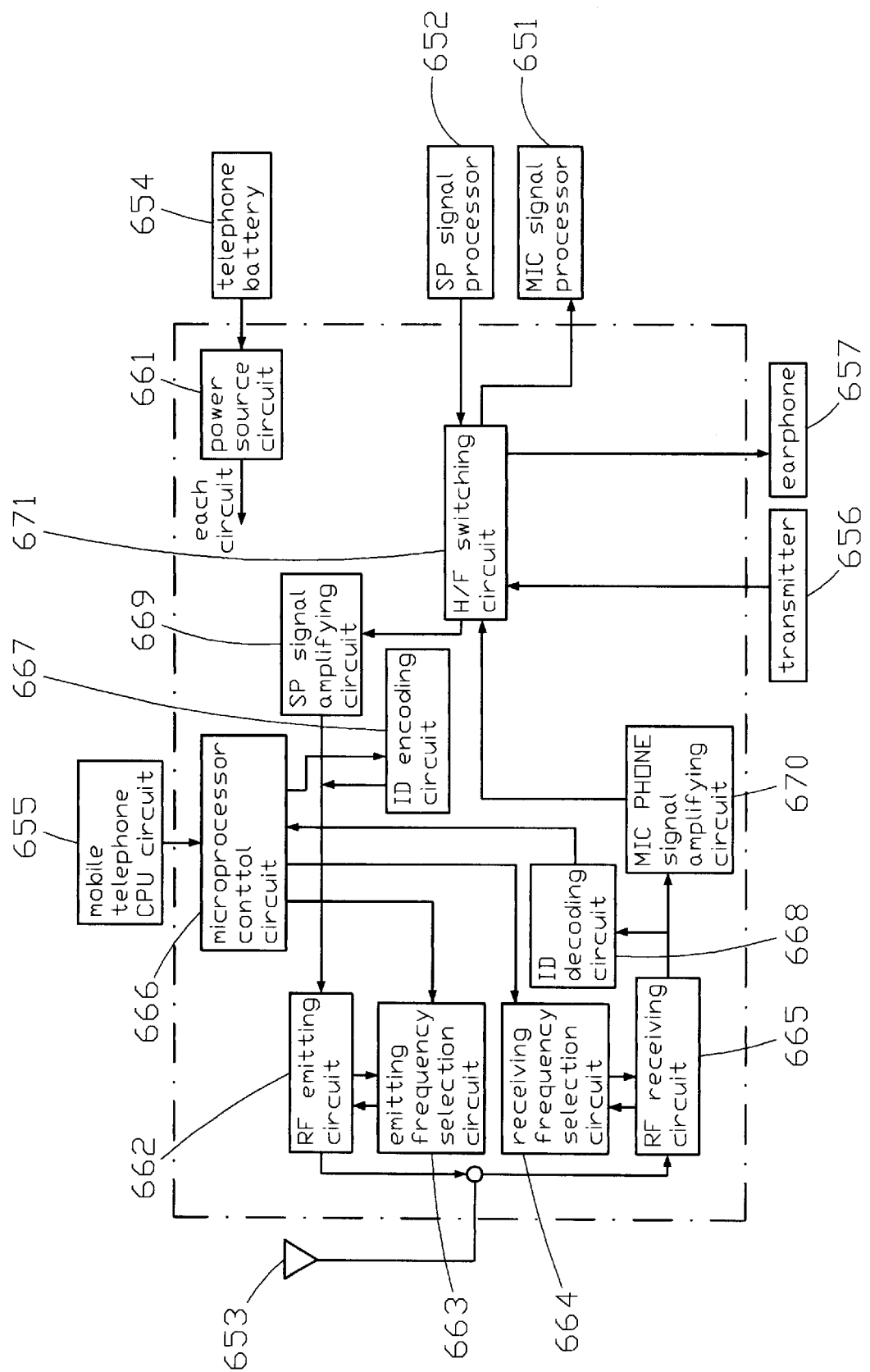
FIG. 5 is a block diagram of a circuit built in a mobile telephone using the radio transmission mode of the present invention.
Figure 6:
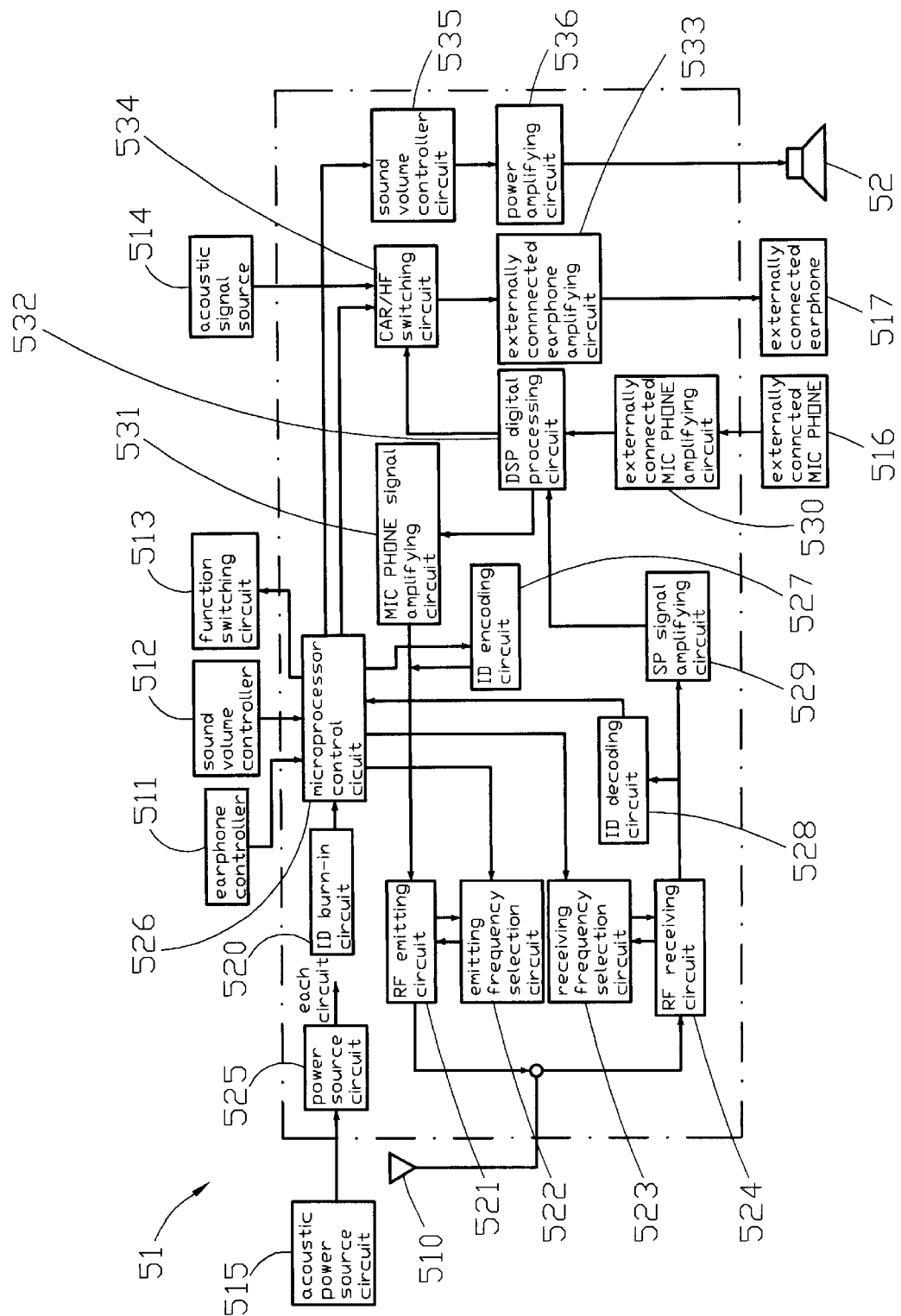
FIG. 6 is a block diagram of a circuit built in a car hi-fi set using the radio transmission mode of the present invention.

In a second embodiment wherein the radio transmission principle is used instead of the infrared transmission principle of the first embodiment, there is a radio transmission device comprised of a circuit in a telephone signal transmission card having a block diagram as shown in FIG. 4, a circuit built in a mobile telephone having a block diagram as shown in FIG. 5 and a circuit built in a car hi-fi set having a block diagram as shown in FIG. 6.

Referring to FIG. 4, the circuit of the telephone signal transmission card 61 in the block diagram is comprised of an antenna 610, a telephone power line 611, an I/O control circuit 612, a telephone SP signal output terminal 613, a telephone MIC PHONE signal input terminal 614, an RF emitting circuit 620, an emitting encoding circuit 621, a receiving encoding circuit 622, an RF receiving circuit 623, a CPU controller 624, an ID encoding circuit 625, an ID decoding circuit 626, an SP signal multiplying circuit 627, an MIC PHONE signal multiplying circuit 628, a power source circuit 629, an H/F activating circuit 630, a P/BH/F switching circuit 631, an MIC PHONE signal multiplying circuit 632, an earphone multiplying circuit 633, an externally connected MIC PHONE 634 and an externally connected earphone 635 etc.

Referring to FIG. 5, the circuit built in the telephone 6 in the block diagram is comprised of an MIC signal processor 651, an SP signal processor 652, a mobile telephone antenna 653, a telephone battery 654, a mobile telephone CPU circuit 655, a transmitter 656, an earphone 657, a power source circuit 661, an RF emitting circuit 662, an emitting frequency selection circuit 663, a receiving frequency selection circuit 664, an RF receiving circuit 665, a microprocessor control circuit 666, an ID encoding circuit 667, an ID decoding circuit 668, an SP signal multiplying circuit 669, an MIC PHONE signal multiplying circuit 670 and an H/F switching circuit 671 etc.

Referring to FIG. 6 which is a block diagram of a circuit 51 built in a car hi-fi set 5 using the radio transmission mode of the present invention, the circuit 51 is comprised of a signal transmission antenna 510, an earphone controller 511, a sound volume controller 512, a function switching circuit 513, an acoustic signal source 514, an acoustic power source circuit 515, an externally connected MIC PHONE 516, an externally connected earphone 517, a speaker 52, an ID burn-in circuit 520, an RF emitting circuit 521, an emitting frequency selection circuit 522, a receiving frequency selection circuit 523, an RF receiving circuit 524, a power source circuit 525, a microprocessor control circuit 526, an ID encoding circuit 527, an ID decoding circuit 528, an SP signal multiplying circuit 529, an externally connected MIC PHONE multiplying circuit 530, an MIC PHONE signal multiplying circuit 531, a DSP digital processing circuit 532, an externally connected earphone multiplying circuit 533, a CAR/HF switching circuit 534, a sound volume controller circuit 535 and a power multiplying circuit 536.

Figure 7:
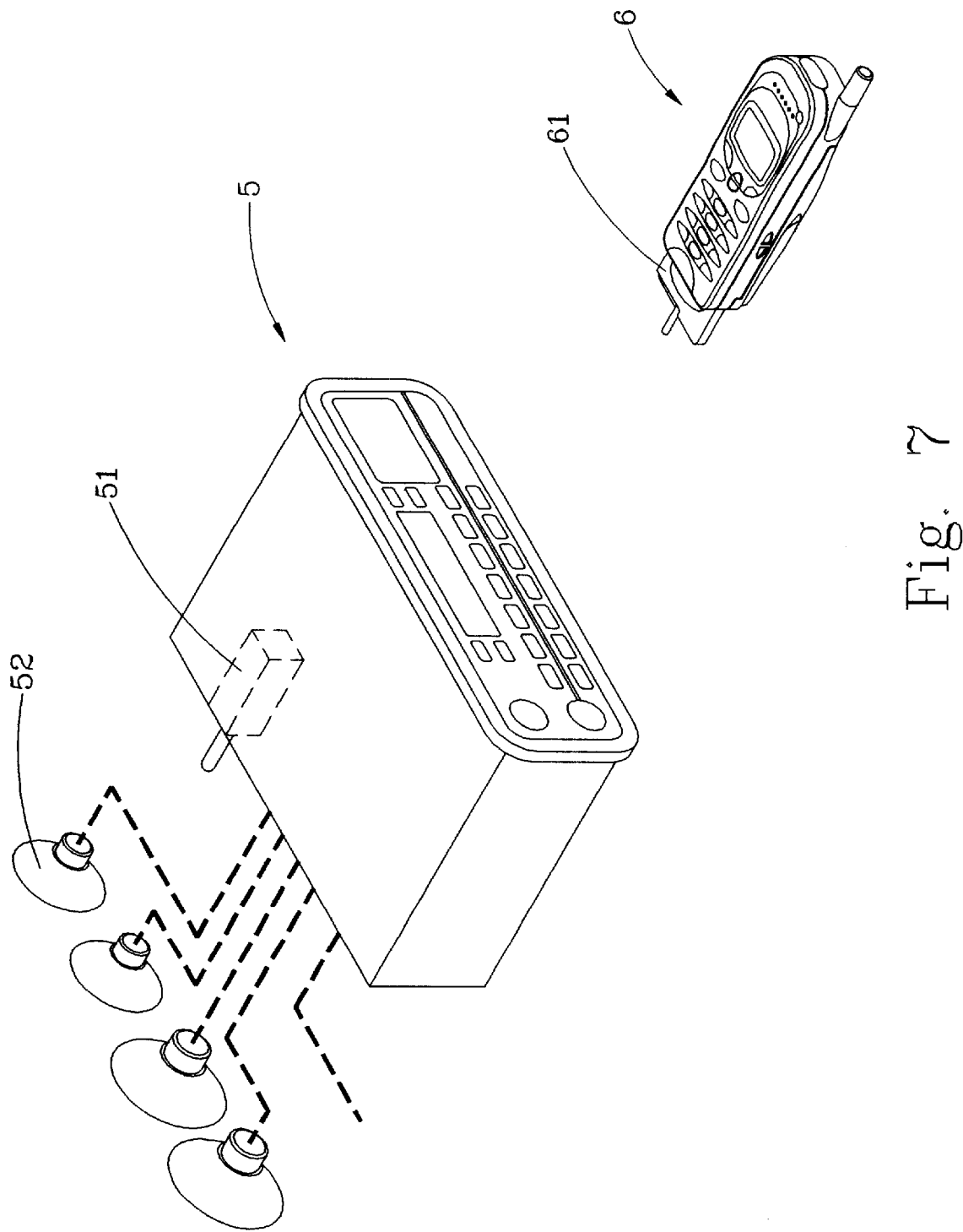
FIG. 7 is a schematic view showing the radio transmission mode of the present invention.

Referring to FIG. 7 which is a schematic view showing the mode of using of the present embodiment, it is same as the former embodiment in operation as well as function and can also achieve the wireless transmission function without connection to the car hi-fi set 5 via a signal line.

These two former embodiments are only examples in practice of the present invention, wherein the block diagrams of circuits can be changed in pursuance of increasing and decreasing of the functions required in practical use.

In conclusion, the wireless mobile telephone capable of remitting picking up of an earphone in use but combining with car hi-fi speakers of the present invention not only remits picking up of an earphone in use just as the case of a conventional mobile telephone, but further firstly uses the wireless transmission mode between a mobile telephone and a car hi-fi set to get the advantages of wireless connection. And it is really an improvement; its industrial value and effect of use are evident.

Having thus described my invention, what I claim as new and desire to be secured by Letters Patent of the United States are:

1. A handsfree wireless mobile telephone comprising:
   a wireless transmission device provided between said mobile telephone and a car stereo, said wireless transmission device is used to communicate signals between said mobile telephone and said car stereo, speakers of said car stereo being used to broadcast received communications from said mobile phone; wherein
   said wireless transmission device is an infrared transmission device comprising a circuit provided in said car stereo and a circuit provided in an infrared signal transmission card in said mobile telephone, said circuit provided in said car stereo comprising
      an infrared receiving device,
      an infrared transmitting device,
      an infrared transmitting circuit,
      a microphone signal amplifying circuit,
      an infrared receiving circuit,
      a speaker signal amplifying circuit,
      an indexed signal detecting circuit,
      an externally connected microphone circuit,
      an externally connected microphone,
      a digital system processor digital encoding circuit,
      a sound silencing switching circuit,
      a CPU controller,
      a front amplifier,
      a stereo signal source,
      a power source circuit,
      a sound volume control circuit,
      a power amplifying circuit, and
      a car speaker.

2. The handsfree wireless mobile telephone of claim 1, wherein:
   said infrared signal transmission card in said mobile telephone comprises an infrared transmitting device, an infrared receiving device,
a telephone handsfree activating terminal,
a telephone speaker signal output terminal,
a telephone microphone signal output terminal,
a telephone power source output terminal,
an infrared transmitting circuit,
an indexed signal generating circuit,
a speaker signal amplifying circuit,
an externally connected earphone,
an earphone amplifying circuit,
a portable/infrared ray function switching circuit,
a handsfree activating circuit,
an infrared receiving circuit,
a microphone amplifying circuit,
a microphone amplifying circuit,
a power source circuit, and
an externally connected microphone.

3. A handsfree wireless mobile telephone comprising:
a wireless transmission device provided between said mobile telephone and a car stereo, said wireless transmission device is used to communicate signals between said mobile telephone and said car stereo, speakers of said car stereo being used to broadcast received communications from said mobile phone; wherein
said wireless transmission device is a radio transmission device comprising a circuit in a telephone signal transmission card, a circuit built in said mobile telephone, and a circuit built in said car stereo, wherein said circuit built in said car stereo comprises
a signal transmission antenna,
an earphone controller,
a sound volume controller,
a function switching circuit,
an acoustic signal source,
an acoustic power source circuit,
an externally connected microphone,
an externally connected earphone,
a speaker, an ID burn-in circuit,
an RF transmitting circuit,
a transmitting frequency selection circuit,
a receiving frequency selection circuit,
an RF receiving circuit,
a power source circuit,
a microprocessor control circuit,
an ID decoding circuit,
a speaker signal amplifying circuit,
an externally connected microphone amplifying circuit,
a microphone signal amplifying circuit,
a digital system processor digital encoding circuit,
an externally connected earphone amplifying circuit,
a car/handsfree switching circuit,
a sound volume controller circuit, and
a power amplifying circuit.

4. The handsfree wireless mobile telephone of claim 3, wherein said circuit of said telephone signal transmission comprises:
an antenna,
a telephone power line,
an I/O control circuit,
a telephone speaker signal output terminal,
a telephone microphone signal input terminal,
an RF transmitting circuit,
a transmitting encoding circuit,
a receiving encoding circuit,
an RF receiving circuit,
a CPU controller,
an ID encoding circuit,
an ID decoding circuit,
a speaker signal amplifying circuit,
a microphone amplifying circuit,
a power source circuit,
a handsfree activating circuit,
a portable/handsfree switching circuit,
a microphone signal amplifying circuit,
an earphone amplifying circuit,
an externally connected microphone, and
an externally connected earphone.

5. The handsfree wireless mobile telephone of claim 3, wherein said circuit built in said telephone comprises:
a microphone signal processor,
a speaker signal processor,
a mobile telephone antenna,
a telephone battery,
a mobile telephone CPU circuit,
a transmitter,
an earphone,
a power source circuit,
an RF transmitting circuit,
a transmitting frequency selection circuit,
a receiving frequency selection circuit,
an RF receiving circuit,
a microprocessor control circuit,
an ID encoding circuit,
an ID decoding circuit,
a speaker signal amplifying circuit,
a microphone signal amplifying circuit, and
a handsfree switching circuit.

\* \* \* \* \*